(12) United States Patent
Dehlsen (10) Patent No.: US 11,660,572 B2
(45) Date of Patent: *May 30, 2023

(54) WIND AND WAVE DESALINATION VESSEL

(71) Applicant: Dehlsen Associates of the Pacific, Limited, Santa Barbara, CA (US)

(72) Inventor: James George Purnell Dehlsen, Warkworth (NZ)

(73) Assignee: DEHLSEN ASSOCIATES OF THE PACIFIC, LIMITED, Warkworth (NZ)

(*) Notice: Subject to any disclaimer, the term of this patent is extended or adjusted under 35 U.S.C. 154(b) by 0 days.

This patent is subject to a terminal disclaimer.

(21) Appl. No.: 17/163,295

(22) Filed: Jan. 29, 2021

(65) Prior Publication Data

US 2021/0146307 A1 May 20, 2021

Related U.S. Application Data

(60) Continuation-in-part of application No. 17/087,309, filed on Nov. 2, 2020, which is a division of
(Continued)

(30) Foreign Application Priority Data

Sep. 22, 2017 (NZ) ........................................ 735748

(51) Int. Cl.
*B01D 61/08* (2006.01)
*B01D 61/02* (2006.01)
(Continued)

(52) U.S. Cl.
CPC ........... *B01D 61/08* (2013.01); *B01D 61/025* (2013.01); *B01D 61/026* (2022.08); *B01D 61/10* (2013.01);
(Continued)

(58) Field of Classification Search
CPC ...... B01D 61/08; B01D 61/025; B01D 61/10; B01D 63/06; B01D 61/022;
(Continued)

(56) References Cited

U.S. PATENT DOCUMENTS 4,222,874 A 9/1980 Connelly
9,834,455 B2 12/2017 Frolov et al.
(Continued)

FOREIGN PATENT DOCUMENTS

EP 1637214 A1 3/2006
WO 2016057717 A1 4/2016

OTHER PUBLICATIONS

Ma et al. Proceedings of the ASME 2014 International Design Engineering Technical Conferences and Computers and Information in Engineering Conference. vol. 5A: 38th Mechanisms and Robotics Conference. Buffalo, NY, USA, Aug. 17-20, 2014. (Year: 2014).*
(Continued)

*Primary Examiner* — Pranav N Patel (57) ABSTRACT

The present invention provides a novel floating and renewable energy-powered desalination vessel, which also functions as a wind turbine generator and wave energy generator platform. With energy derived from the wind and waves, the vessel performs reverse osmosis within a vertically positioned cylindrical section extending below a buoyancy chamber. The cylindrical section contains reverse osmosis membranes located above a seawater screening and filtration system, which serve as ballast. The entire vessel and power systems are configured to have the center of mass below the center of buoyancy, forming a vertically stable floating structure with minimum pitch, roll, and wave heave in high sea states. The electric power generated is utilized internally to produce desalinated water or hydrogen from the desalinated water's electrolysis, power an onboard data center, or power delivery to a shoreside power grid. In addition to a
(Continued)

wind turbine generator and a wave energy generator, a photovoltaic array or a marine current generator may be utilized to power these applications. Alternatively, the desalination vessel operates with the assistance of shore-based power provided by cable.

14 Claims, 7 Drawing Sheets

Related U.S. Application Data application No. 16/129,783, filed on Sep. 12, 2018, now abandoned.

(51) Int. Cl.
*B01D 61/10* (2006.01)
*B01D 63/06* (2006.01)
*C02F 1/44* (2023.01)
*B63B 43/06* (2006.01)
*B63B 1/04* (2006.01)
*B63B 77/00* (2020.01)
*C02F 103/08* (2006.01)
*B63B 43/04* (2006.01)
*B63B 35/44* (2006.01)
*B63B 39/03* (2006.01)
*B63B 1/10* (2006.01)

(52) U.S. Cl.
CPC ............ *B01D 63/06* (2013.01); *B63B 1/048* (2013.01); *B63B 43/06* (2013.01); *B63B 77/00* (2020.01); *C02F 1/441* (2013.01); B01D 2313/06 (2013.01); B01D 2313/20 (2013.01); B01D 2313/54 (2013.01); B01D 2313/56 (2013.01); B01D 2315/06 (2013.01); B01D 2317/04 (2013.01); B01D 2317/06 (2013.01); B63B 1/107 (2013.01); B63B 39/03 (2013.01); B63B 2001/044 (2013.01); B63B 2035/442 (2013.01); B63B 2043/047 (2013.01); C02F 2103/08 (2013.01); C02F 2201/007 (2013.01); C02F 2201/008 (2013.01); C02F 2303/10 (2013.01); C02F 2307/00 (2013.01)

(58) Field of Classification Search
CPC ............ B01D 2317/06; B01D 2313/54; B01D 2315/06; B01D 2313/20; B01D 2313/36; B01D 61/06; B01D 2313/246; B01D 61/12; B01D 2313/367; C02F 1/441; C02F 2307/00; C02F 2103/08; C02F 2201/007; C02F 2201/008; C02F 2303/10; C02F 2201/009; C02F 1/44; B63B 43/06; B63B 1/048; B63B 77/00; B63B 2043/047; B63B 2035/442; B63B 39/03; B63B 2001/044; B63B 1/107; B63B 43/14; B63B 2001/145; B63B 2035/446; B63B 22/00; B63B 2209/20; Y02A 20/141; Y02A 20/144; Y02A 20/131; Y02A 20/124; Y02W 10/30; Y02W 10/33; Y02E 10/727; Y02E 10/72

See application file for complete search history.

(56) References Cited

U.S. PATENT DOCUMENTS

| | | | |
|---|---|---|---|
| 10,982,654 B1* | 4/2021 | Dehlsen | F03D 7/0204 |
| 2003/0189000 A1 | 10/2003 | Stark et al. | |
| 2006/0119106 A9* | 6/2006 | Borden | C25B 1/04 |
| | | | 290/44 |
| 2010/0126164 A1 | 5/2010 | Gerber et al. | |
| 2011/0215039 A1 | 9/2011 | Acernese et al. | |
| 2012/0001431 A1* | 1/2012 | Smith | E02B 17/0004 |
| | | | 290/53 |
| 2015/0260152 A1 | 9/2015 | Dehlsen | |
| 2015/0290589 A1 | 10/2015 | Hoffman | |
| 2016/0101994 A1 | 4/2016 | Voung | |
| 2016/0369646 A1* | 12/2016 | Hendrix | F03D 3/0427 |
| 2017/0233977 A1 | 8/2017 | Cole et al. | |
| 2017/0349455 A1 | 12/2017 | Katz | |
| 2019/0078556 A1* | 3/2019 | Stiesdal | F03D 13/25 |
| 2019/0162167 A1* | 5/2019 | Gonzalez Perez | F03D 1/06 |
| 2020/0010155 A1* | 1/2020 | Robinson | F03D 9/008 |

OTHER PUBLICATIONS

Miriello et al., Proceedings of the ASME 2019 38th International Conference on Ocean, Offshore and Arctic Engineering OMAE2019 Jun. 9-14, 2019, Glasgow, Scotland, UK. (Year: 2019).*

* cited by examiner

WIND AND WAVE DESALINATION VESSEL

CROSS-REFERENCE TO RELATED APPLICATIONS

The present application is a continuation-in-part of U.S. patent application Ser. No. 17/087,309, entitled "Reverse Osmosis Water Production Apparatus," and filed on Nov. 2, 2020, which claims priority to U.S. patent application Ser. No. 16/129,783, entitled "Reverse Osmosis Water Production Apparatus," and filed on Sep. 12, 2018, which claims priority to New Zealand Patent Application No. 735748, filed Sep. 22, 2017, the entire disclosures of which are all incorporated by reference herein.

BACKGROUND OF THE INVENTION

1. Field of Invention

This invention relates to floating, renewable energy-powered desalination plants.

2. Description of Related Art

Reverse osmosis (RO) systems for high volume seawater to freshwater production are generally land-based. RO systems are typically implemented as either a large central plant near the coast or a smaller system, packaged in a shipping container type enclosure. Both types draw seawater into the RO system and produce approximately half of the intake volume as desalinated water while discharging the remainder as brine back into the ocean.

Regions where water supplies are limited and costly or experiencing significant drought (or other interruption to the regular water supply) require the prompt establishment of a substantial new water supply. Large central RO plants require years of planning and construction, along with the need for a significant electric power supply. Furthermore, high-capacity pipelines are needed to draw seawater into the RO system and discharge brine back into the ocean. The seawater intake must minimize entrainment of marine life and avoid the pooling of brine on the seafloor around the end of a discharge pipe, both of which adversely impact marine life in the vicinity and are critical hurdles in meeting environmental regulations.

Marine barge-mounted or ship-based systems, which are available and capable of transiting at sea, are stationed in coastal areas needing freshwater. Some of these systems are equipped with onboard electric power generation dependent on external fuel supplies or an onshore power connection. For example, Spain Patent No. 2,265,738 to Martinez, the disclosure of which is incorporated herein by reference in its entirety, is a floating platform that includes a hydraulic pumping mechanism actuated by a wind generator. The mechanical pumping mechanism forces water through a desalination plant above the water surface.

Desalination systems on marine vessels utilize RO membranes in tubular pressure vessels orientated horizontally to fit a horizontal deck arrangement. United States Patent Application Publication No. 2017/0349455 to Katz, the disclosure of which is incorporated herein by reference in its entirety, is an example of a semi-submersible structure that employs RO membrane tubes oriented horizontally above the water surface.

An RO surface vessel may impose an undesirable view on coastline natural beauty, which is particularly unwelcome if the vessel is moored in an area dependent on tourism. A permanently moored RO surface vessel for long-term commercial water delivery to shore is not easily moved out of harm's way. Vessels with an extensive surface profile are especially vulnerable to high winds and wave forces. Marine surface vessels are also subject to extreme environmental forces such as wind and waves, where pitch and roll in high seas can test survival.

SUMMARY OF THE INVENTION

The present invention overcomes these and other deficiencies of the prior art by providing a novel floating and renewable energy-powered desalination vessel, which functions as a floating platform for a wind turbine generator (WTG) and a wave energy converter (WEC) generator or hydraulic pump for powering an onboard reverse osmosis desalination system. The vessel provides either electric power or desalinated water, or a combination of both. The vessel performs reverse osmosis within vertically positioned cylindrical sections extending below a surface buoyancy chamber. A cylindrical section below the buoyancy chamber contains the reverse osmosis equipment and a seawater screening system, below which is a ballast section including a media filtration system for inbound seawater. The buoyancy chamber has a low-profile on the water surface.

The turbine tower's vertical axis is offset downwind from the spar/ballast cylindrical section's vertical axis. The forward-aft buoyancy distribution of the buoyancy chamber provides greater buoyancy toward the vertical axis of the tower than the vertical axis of the spar/ballast cylindrical section. This offset results in greater resistance to the overturning moment induced by wind thrust loading on the WTG. This resistance to the overturning force of the wind thrust load on the turbine is enhanced by downwind outrigger pontoons, which become increasingly submerged as wind velocity increases, thereby limiting the WTG and tower from pitching backward. Simultaneously, the spar/ballast mass upwind of the tower restrains the wind force overturning moment on the tower and WTG. This forward-aft resistance to wind loads affords safety and total mass reduction.

In an embodiment of the invention, a floating vessel comprises a spar buoy; a tower affixed to the spar buoy; a wind turbine generator connected to the tower; one or more outriggers, wherein each of the one or more outriggers comprises a float; and an adjustable strut coupling the one or more outriggers to the tower. The floating vessel may further include a wave energy converter coupled to the adjustable strut. The floating vessel may further comprise a desalination system located in the spar buoy. The floating vessel may also include a pump connected to the adjustable strut, wherein the pump is in fluid communication with the desalination system. The floating vessel may further comprise a thruster affixed to the float of one of the one or more outriggers. The adjustable strut includes an actuator to adjust the length of the adjustable strut. The actuator also adjusts an angle formed between the tower and the one or more outriggers. The spar buoy comprises a buoyancy chamber, cylindrical section, and a ballast section, the cylindrical section houses the desalination system, and the ballast section comprises a media filtration system in fluid communication with the desalination system. The floating vessel further comprises a hydrolysis system in fluid communication with the desalination system, wherein hydrogen or oxygen produced by the hydrolysis system is stored in the buoyancy chamber. A vertical axis of the turbine may be offset downwind from a vertical axis of the spar buoy.

In another embodiment of the invention, a floating vessel comprises a floating platform; a tower affixed to the floating platform; a wind turbine generator connected to the tower; and means for adjusting the tower's pitch. The floating vessel may further comprise means for adjusting the yaw of the tower and wind turbine generator. The floating vessel may also include a wave energy converter or a pump. The means for adjusting the tower's pitch relative to the floating platform comprises an adjustable strut and one or more outriggers. The floating vessel may further comprise means for converting seawater into freshwater.

In yet another embodiment of the invention, a desalination method comprises the steps of floating a vessel comprising a tower, a wind turbine generator affixed to the tower, and one or more outriggers coupled to the tower via at least one strut; converting, via the wind turbine generator, wind energy into first electrical energy; converting wave energy, via the one or more outriggers coupled to the tower via the at least one strut, into second electrical energy or pump action; and desalinating, onboard the vessel, seawater into freshwater using one or more of the first electrical energy, the second electrical energy, and the pump action. The desalination method may further comprise the step of adjusting, via the at least one strut, the pitch of the wind turbine generator. The desalination method may further comprise the step of adjusting the yaw of the wind turbine generator. The desalination method may further comprise the step of separating the freshwater into hydrogen and oxygen.

The center of mass of the entire structure—spar buoy vessel, WTG, WEC, outriggers floats—is below its center of buoyancy. This separation forms an inherently stable vertical platform resisting pitch and roll. Vessel wave heave response is minimal due to the small volumetric displacement of the buoyancy chamber by waves, relative to the structure's substantial mass, offering greater safety in extreme sea states. The platform's vertical stability and inertia are well suited to react to the typically short period (~8 to 14 seconds) heave force of waves, which is captured by an attached float to drive electrical generators or hydraulic pumps for the desalination process.

In the event of a calm period where both wind and wave action are insufficient, the desalination vessel can operate with the assistance of shore-based power transmitted by a marine power cable. Alternatively, depending on the renewable energy resources available at the RO water desalination site, a photovoltaic array or a marine current turbine-driven generator may be utilized to power the desalination pump(s), in addition to the WTG and WEC.

Electric power generated on the platform can also be delivered to the shore grid or utilized internally for various other applications, such as data server operation or electrolysis of the desalinated water for hydrogen and oxygen production.

A microcontroller with an embedded processor optimizes the wind/wave energy conversion and manages the structural loads in a variety of sea states to assure safety and design life. Control inputs include wind and sea-state conditions, allowing the microcontroller to anticipate and respond to wind turbine and wave generator loads while optimizing power production. By employing active power and load controls, the platform's structural mass may be reduced, replacing passive structure to resist loads with active, controller-based loads management to reduce the frequency and severity of loads being borne by the structure. This novel integration of functional elements managed by an overriding, supervisory control system operating over a range of wind and sea state conditions on the platform translates into lower-cost, higher reliability electric power, and lower cost desalinated water.

Significant synergies are gained by the novel approach of this invention to integrate a wind turbine and a wave energy generator on a floating platform for seawater desalination. These synergies follow:

Single platform—avoiding separate individual platforms for each function of power generation (wind and wave energy) and their respective anchoring, power cables, and other installation costs present substantial savings in desalination plant infrastructure. By integrating a wind turbine generator and a wave energy generator on the reverse osmosis vessel, the total reduced mass and simplified infrastructure of this combination significantly decreases overall capital and operating costs. The reduced cost of energy resulting from the efficient integration of these various systems on a single platform also reduces desalinated water cost.

Towerhead mass reduction—the present invention substantially reduces total mass and transforms the structural component requirements of a floating offshore wind turbine/desalination platform by i) eliminating the conventional heavy tower top yaw system; instead, the yawing function for the turbine to track and align with the wind direction, is moved down to below the water surface, by yawing the buoyancy chamber through activating the connected outrigger pontoon thrusters; (ii) resisting the overturning force of the wind on the turbine and tower, by said outrigger pontoons, which are always positioned downwind of the prevailing wind direction, through activating the pontoon thrusters; (iii) offsetting the tower axis downwind from the spar axis; and (iv) distributing buoyancy volume of the buoyancy chamber, with greater buoyancy aft, and less forward.

For a five (5) MW floating offshore reference turbine, the substantial mass (65 tons) of the yaw system at the top of the tower is eliminated, reducing the needed structural compression support and hence, the tower's mass. A further significant tower mass reduction is achieved by the narrowed direction of wind force loads as turbine and tower are yawed, as needed, to adjust to changes in the wind direction. With this relatively unidirectional wind loading, the tower bending strength for wind force loading is narrowed from 360 degrees (for a fixed position tower where turbine yawing is at the tower head) to ~45 degrees (with yawing tower) of wind force direction, reducing the tower structure required through ~315 degrees of wind direction, which may amount to a tower mass reduction by as much as 25%.

Total mass reduction—the mass reduction above the water surface has a multiplier effect on total platform mass when the below-the-surface mass is factored. The present invention results in i) reduced tower head mass (eliminating the yaw system), ii) reduced tower load-bearing of the head mass, requiring less tower structure/mass to support it, and iii) narrowed directional strength and stiffness needed for the tower to support the rotor thrust loads, further reducing the structure/mass requirement for the tower. This above-the-surface mass reduction leverages substantial mass decrease in the vessel by iv) requiring less ballast, v) less flotation volume, and/or vi) a shorter spar to counterbalance the above-surface mass and its overturning moment. The resulting total system mass is reduced by approximately 1,310 tons for the 5 MW reference turbine or about 26% of the total turbine mass of 5,000 tons.

Separation of the center of buoyancy from the center of mass—the novel topology of the reverse osmosis system is configured to enhance vertical stability by the separation between the center of buoyancy (CB) focused near the buoyancy chamber, below the water surface and the center of mass/gravity (CM) located nearer to the base of the spar platform. The spar base forms the desalination media filter chamber used to screen and filter seawater through sand, gravel, and other dense materials. This heavy chamber, filled with water entering the RO process, serves as ballast for the vessel. Between the buoyancy chamber and the media filter chamber, and rigidly connecting both, is a cylindrical section containing elongated reverse osmosis membrane tubes. This cylindrical section may be neutrally buoyant when the RO membrane tubes and plumbing are filled with water.

Downwind offset of the tower axis from the spar axis—The unique yawing of the platform buoyancy chamber, for the turbine to face the wind, with the rotor plane perpendicular to the wind direction, also incorporates horizontal fore-aft buoyancy and mass distribution to resist the overturning moment induced by wind thrust loads on the turbine. Here, the tower/turbine mass is offset downwind of the spar/ballast mass. The connecting buoyancy chamber has a buoyancy volume distribution, which is proportionately greater near the tower axis than towards the spar axis. The buoyancy volume distribution is made by widening (or deepening) the buoyancy chamber around the tower's axis. This offset has the effect of cantilevering the spar's mass to resist the overturning moment of the wind thrust on the turbine/tower. This allows for reduced outrigger float capacity and less ballast and/or a shorter spar.

Reduced balance-of-plant costs—the wind-wave power system integration with the desalination vessel provides further significant benefits by reduced weight of materials needing transportation, installation, anchoring, and mooring.

Electric power reliability—the combination of wind and wave energy provides greater power supply reliability, where wave action is driven by the long fetch of winds on the ocean surface, while the wind is subject to faster-moving, regional, and local atmospheric pressure differentials. The forecasting of wave action, often weeks ahead, allows a longer period for power/water production planning. Wind forecasting reliability diminishes in a matter of days.

The foregoing and other features and advantages of the invention will be apparent from the following, more particular description of the invention's preferred embodiments, as shown in the accompanying drawings and the claims.

BRIEF DESCRIPTION OF THE DRAWINGS

For a complete understanding of the present invention and its advantages, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-4, wherein like reference numerals refer to like elements. The present invention may be deployed in any water environment, preferably where one or more renewable energy sources are available. Pipeline connection to a shore-based water offtake infrastructure is required unless at-sea water delivery is available, for example, for a cruise ship water supply. Connection to an onshore electrical grid is optional.

The present invention provides a novel topology for integrating a desalination system with a renewable energy generator, such as a wind turbine on a tower mounted on top of a spar buoy. Compelling synergies result from this integration. Offshore wind turbines require high stability with minimum pitch, roll, and heave in response to sea states and must also be resistant to the wind's overturning force against the wind turbine's rotor and tower. Among other advantages, the present invention adjusts the wind turbine's wind-induced pitch/tilt via one or more reactive struts connected to hinged outrigger floats. The inclusion of a wave electric generator coupled in the strut offers added electric power generation with minimal additional cost beyond the generator, controls, and integration in the power supply. The present invention may also implement other types of renewable energy generators such as, but not limited to, a solar photovoltaic array or a marine current turbine generator.

Figure 1A:
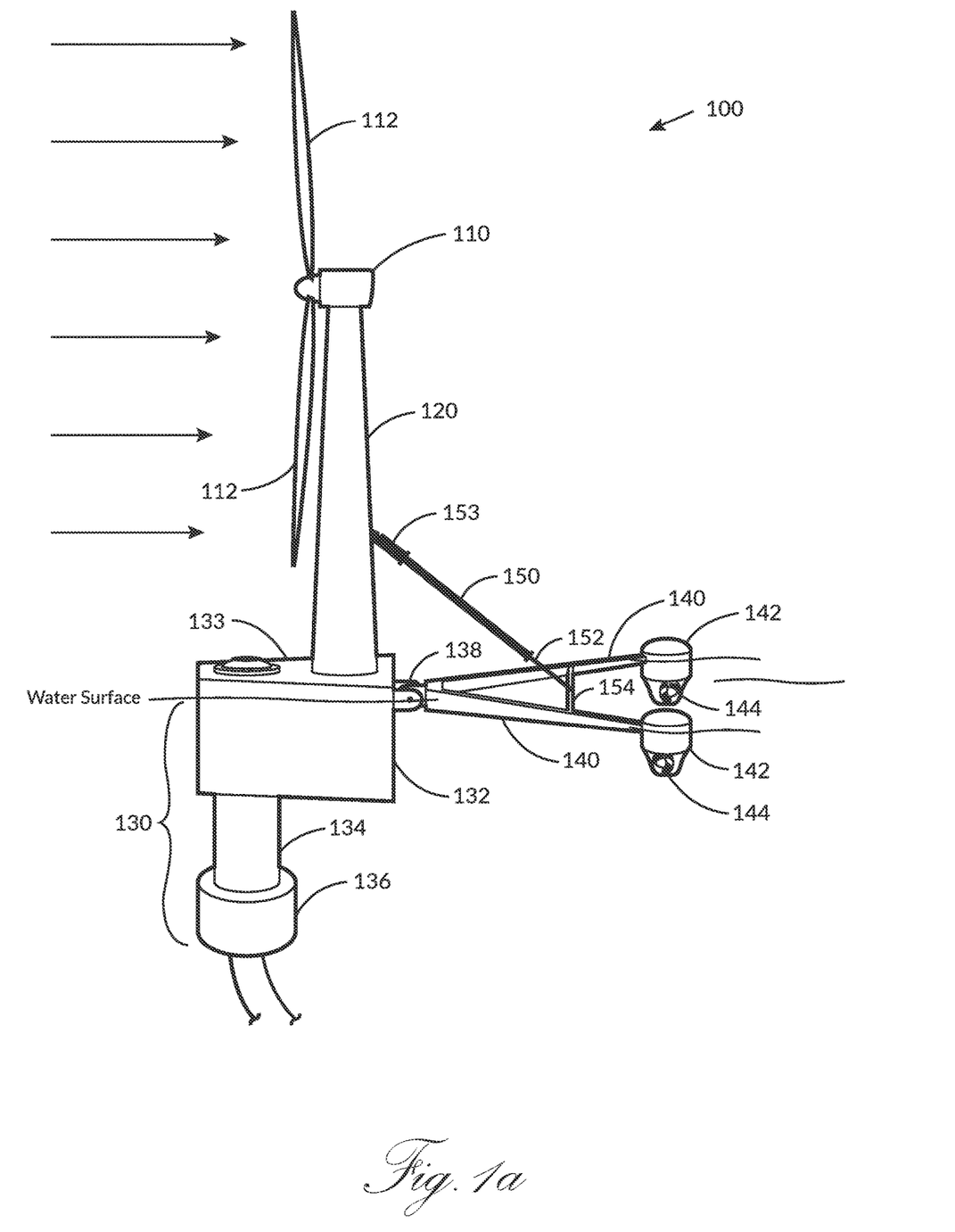
FIG. 1a illustrates a floating and renewable energy-powered desalination vessel according to an embodiment of the invention.

FIG. 1a illustrates a floating and renewable energy-powered desalination vessel 100 according to an embodiment of the invention. The vessel 100 comprises a wind turbine generator (WTG) 110 with rotor blades 112, a tower (mast) 120, a spar buoy 130 including a main buoyancy section 132, a cylindrical section 134, and a ballast section 136, and one or more outrigger legs 140, preferably at least two, coupled to the spar buoy 130 and mast 120 via a hinge 138. One or more floats or pontoons 142, preferably one, is attached to a distal end of each outrigger leg 140, which together provide a downwind, outboard buoyancy moment force for resisting the tower overturning moment induced by wind thrust on the WTG 110. Disposed on one or more of the pontoons 142 is a marine thruster 144. The mast 120 is rigidly attached to the spar buoy 130 to form the central structure through which wind loads on the WTG 110 are conveyed to the outriggers 140.

Above the ocean surface, deck 133 of the buoyancy chamber 132 joins the mast 120 on which mounts the tower base of the WTG 110. A reactive strut 150 between the mast 120 and outrigger legs 140 and pontoons 142 is extended or contracted in length by a hydraulic or mechanical actuator 152 to react to wind thrust loads. The actuator 152 may be hydraulic or electric/mechanical to extend or contract the strut 150 for tower 120 angle adjustment to wind loading, wind shear, and sea states. Wind shear is monitored to ensure the wind turbine rotor plane maintains uniform or near-uniform wind velocity across the rotor's vertical plane. Such rotor plane pitch adjustment to wind shear and wind thrust loads is novel and results in higher turbine productivity and reduced fatigue of the blades 112, as described below.

The strut 150 is coupled to the outriggers 140 via a crossbar 154. However, in other embodiments of the invention, each outrigger 140 is connected to the spar buoy 130 via a separate hinge 138, and the crossbar 154 is not necessary. In this configuration, each outrigger 140 has its own respective strut 150. Yet, any number, combination, or composition of hinges 138, outriggers 140, struts 150, pontoons 142, and thrusters 144 may be employed with or without crossbars 154. The strut 150 may include a linear motor/generator 153 and a braking system on the strut actuator 152 to maintain the optimum tower pitch angle. The heaving motion of the outrigger floats 142 resulting from the hydrodynamic excitation force from waves drives the linear motor/generator in the strut 150 floats 142. Static position offsets to the strut 150 length for wind load compensation may be applied through a variable position braking system 152, leaving a small operating stroke band for wave energy conversion. In an embodiment of the invention, the strut 150, rather than containing an electrical linear generator, may use a hydraulic pump 153 driven by wave heave on the outrigger float(s), acting independently from the strut length adjustment, which compensates for rotor wind thrust loads and rotor plane pitch adjustment. The vertical rotor plane angle adjustment may obviate or reduce the need for a cyclic blade pitch mechanism, reducing blade pitch mechanism 110 mass while increasing wind energy capture.

Figure 1B:
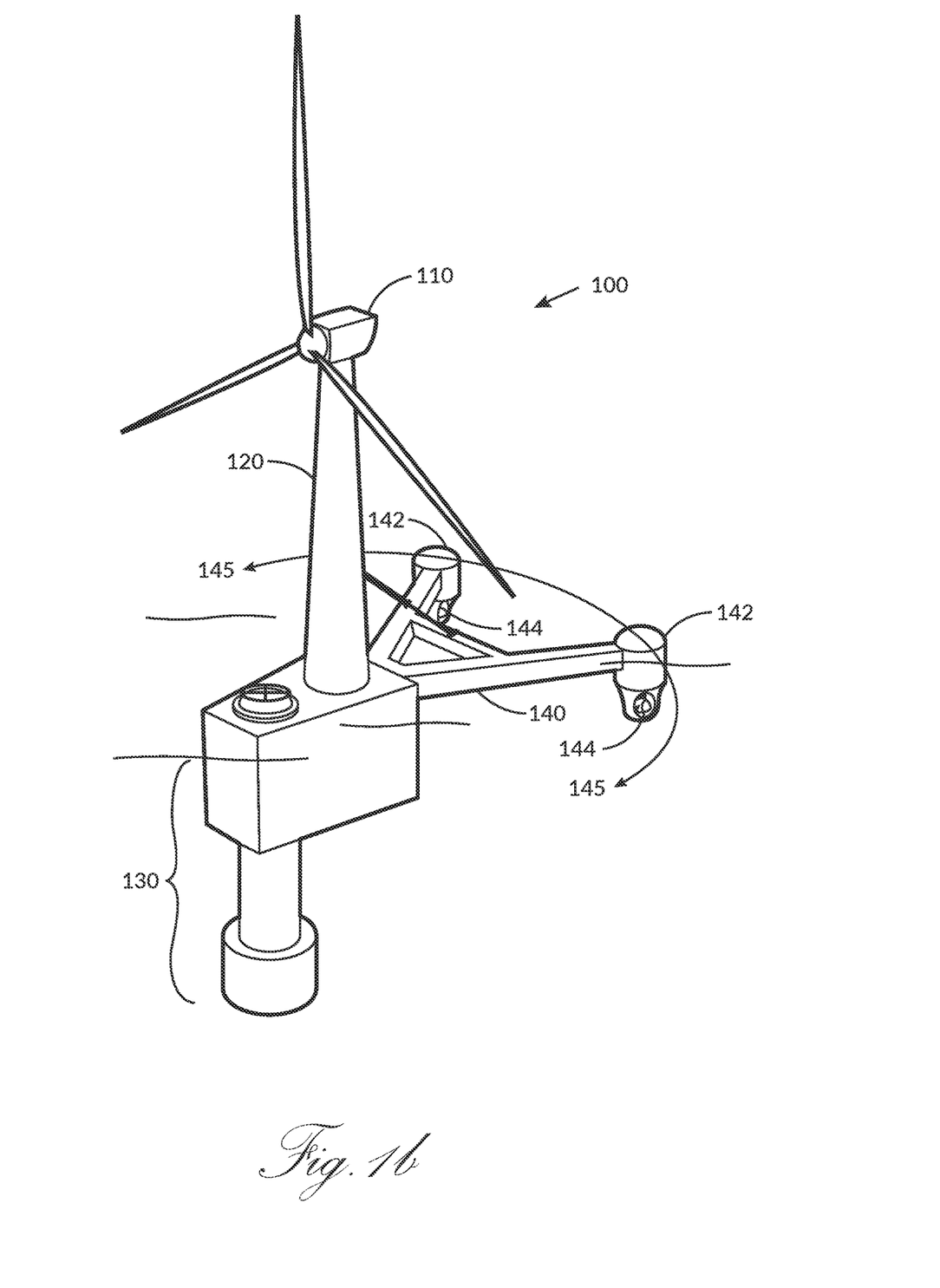
FIG. 1b illustrates the floating and renewable energy powered desalination vessel of FIG. 1a with the downwind outrigger float/thrusters to yaw the turbine.

FIG. 1b illustrates the marine thrusters 144, the identification and implementation of which are apparent to one of ordinary skill in the art. The marine thrusters 144 are mounted on the pontoons 142 and aligned to provide thrust in a direction 145 tangential to the arc of the outriggers 140 between the vertical centroid of the spar buoy 130 and the vertical centroid turbine tower 120. The thrusters 144 provide tangential force to yaw the entire floating wind turbine 110 and renewable energy powered desalination vessel 100 to face the wind or another direction. Wind direction is monitored to maintain a perpendicular or near perpendicular plane of the rotor blades 112 to the wind direction. When a wind direction shift is detected between the vessel's actual azimuth and desired azimuth angle, a controller sends a yaw command to the thrusters 144 to drive the azimuth error to zero.

The horizontal translation of the spar buoy 130 is restricted by a slip collar (not shown) and mooring lines (not shown), the implementation of which is apparent to one of ordinary skill in the art. The slip collar and mooring lines only allow rotational movement of the spar buoy 130.

Figure 2A:
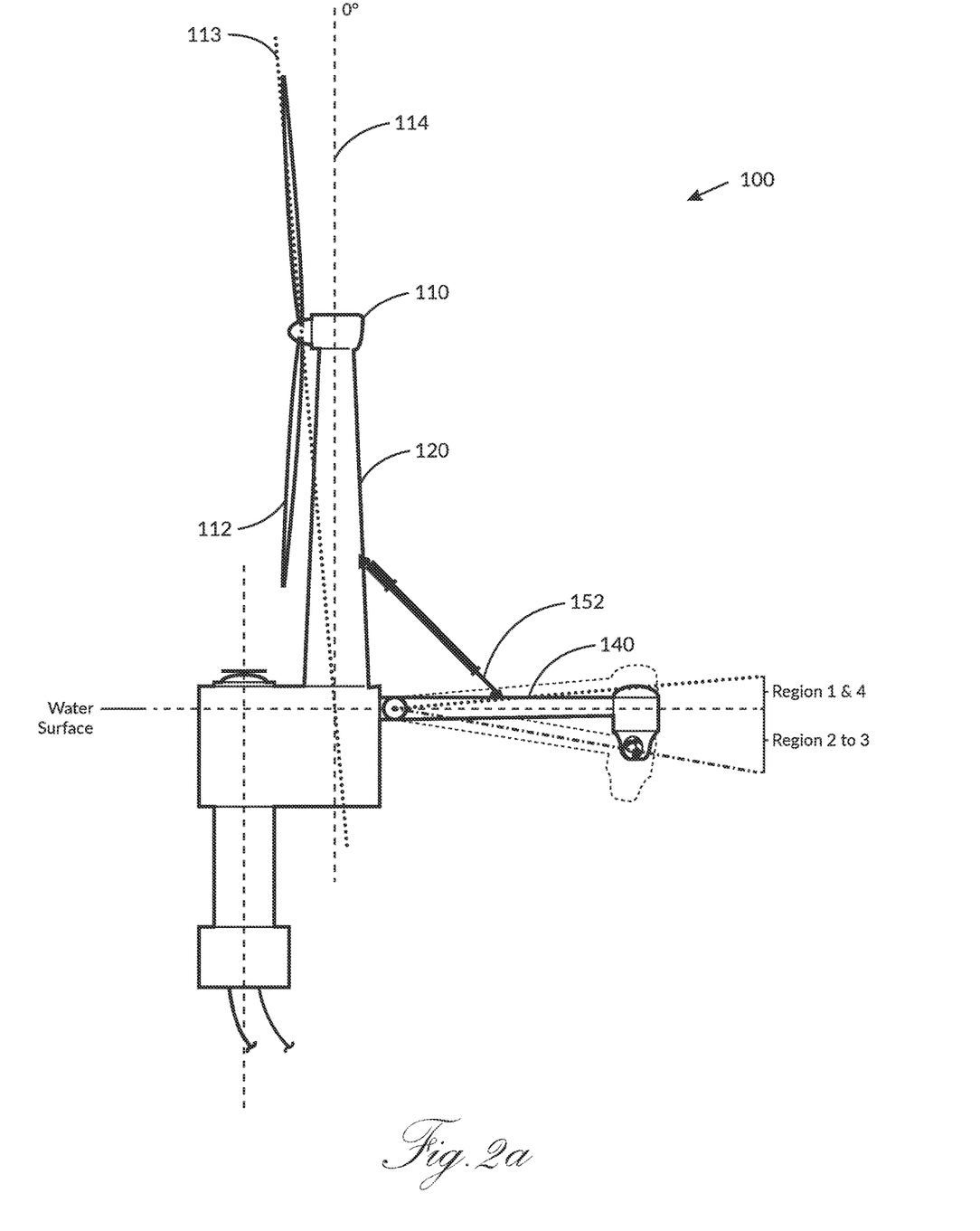
FIG. 2a illustrates a side view of the horizontal and vertical axis of the floating and renewable energy powered vessel of FIG. 1a in a calm, no wind conditions (Region 1), under normal wind conditions (Regions 2 and 3), and the outrigger floats in high wind conditions with the rotor blades feathered (Region 4).
Figure 2B:
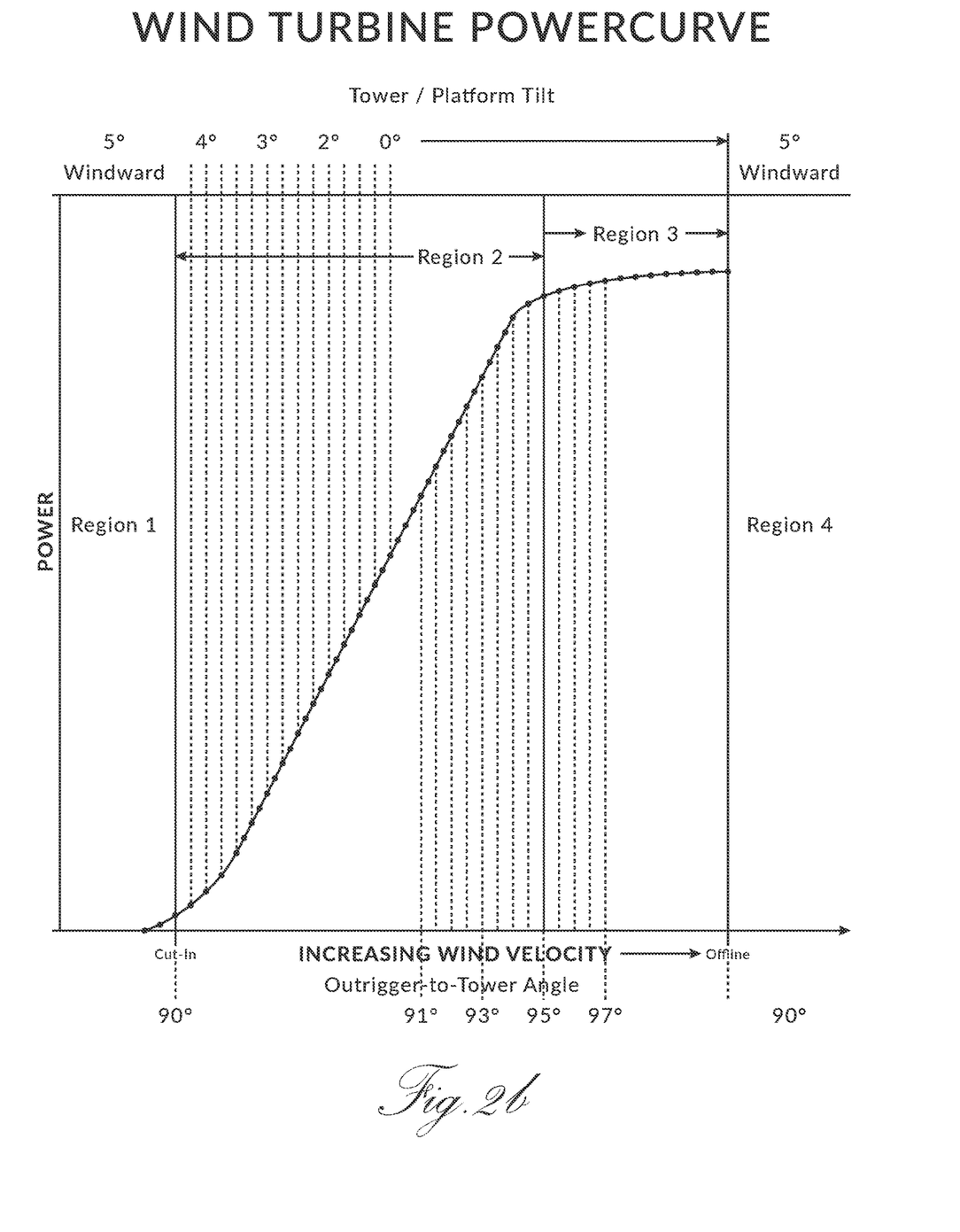
FIG. 2b illustrates the wind turbine power curve in relation to power (y-axis) against wind velocity (x-axis).

FIG. 2a illustrates that the pitching of blades 112 along with the tower 120 to outrigger 140 angle modification by strut actuator 152 serves to manage turbine input power, structural loads, and vessel 100 motion in response to wind and sea state. Blade pitch and generator reaction torque determine rotor shaft input torque and speed and, therefore, the wind kinetic energy into the wind turbine 110, driving the generator. These related actions are demonstrated by the wind turbine 110 power curve, as shown in FIG. 2b, progressing through four operating regions, depending on wind speed. Region 1—wind below cut-in speed, where the generator is off-line. Region 2—operational wind speed of the turbine is below rated power, and here, the blade pitch is maintained at a fixed position, and the generator is on-line, below the rated power. Region 3—wind speed is above rated power, the blades de-pitch, and the generator's back-torque is actively controlled to manage input rotor torque/speed to maintain the generator output at rated power. Region 4—wind above cut-out speed, has blades de-pitched to feather, and the generator is off-line.

Figure 2C:
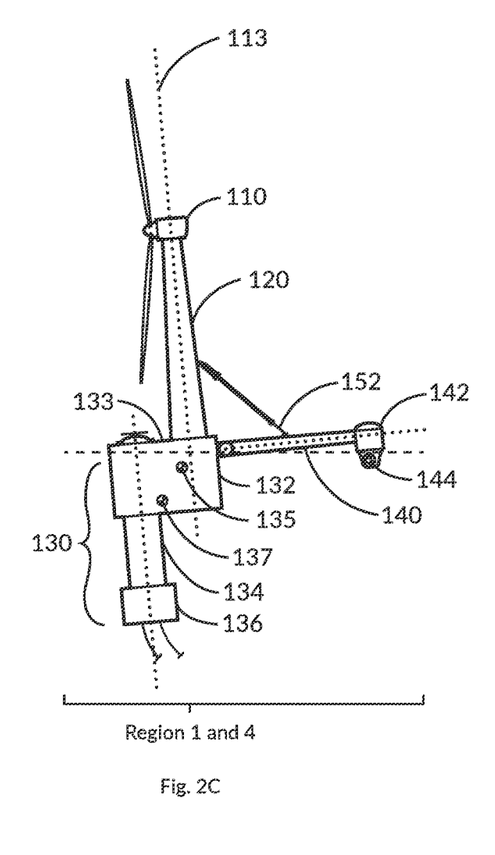
FIGS. 2c, 2d, and 2e illustrate i) platform and outriggers pitched 5 degrees with no wind, ii) operation in a normal range of wind speed, and iii) operation in high wind velocity with outrigger floats at maximum submergence.
Figure 2D:
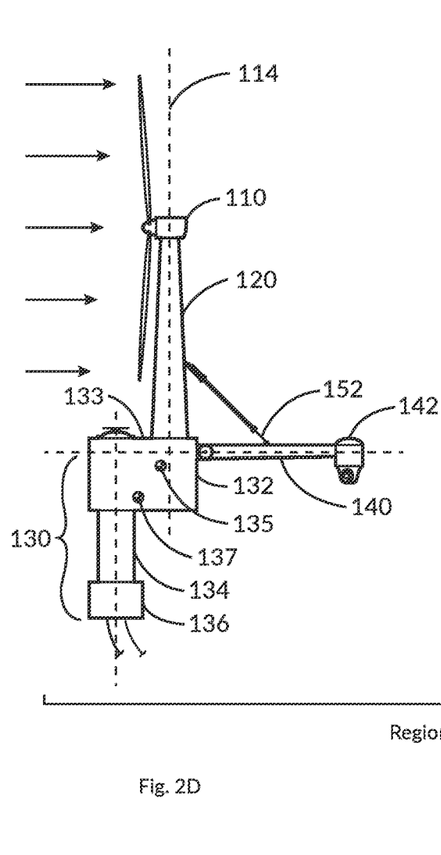
Figure 2E:
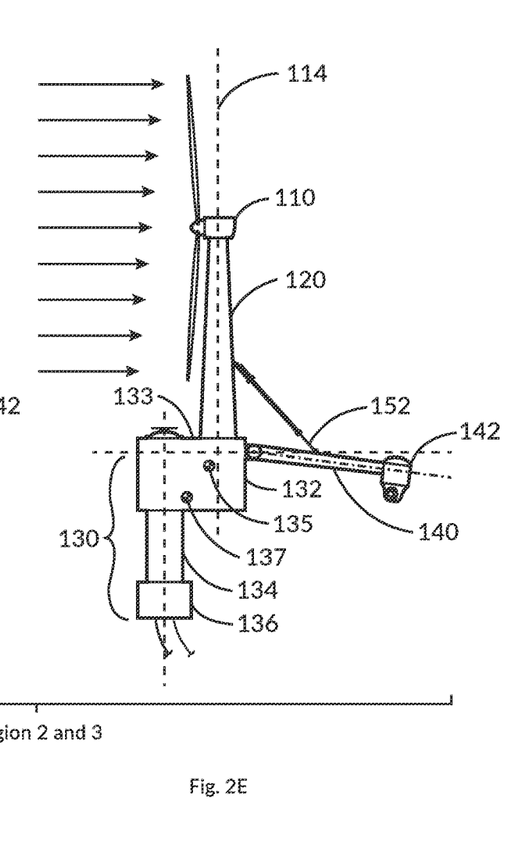

FIGS. 2c, 2d, and 2e illustrate that in Region 1, with the forward tilt/pitch 113, the outrigger floats 142 are raised above the water surface with thrusters 144 still submerged. As wind speed increases to Region 2 above turbine cut-in speed, the floating turbine platform/tower is righted from the forward tilt/pitch 113 of say 5 to 8 degrees, to vertical 114.

Forward pitch/tilt is due to the center of mass 137 located forward/windward of the center of buoyancy 135. With rising wind speed, in the lower end of power Region 2, the platform/tower rotates toward vertical 114 driven by the wind's force on the rotor. As wind speed continues to increase in Region 2 and 3, the turbine controller commands the strut actuators 152 to progressively increase the outrigger 140 angle to the tower, causing the pontoon floats 142 to submerge further, increasing the counterforce needed to maintain vertical or near-vertical tower angle. At the turbine cut-out wind speed of Region 3, the blades are feathered, the turbine generator goes off-line, and the outriggers 140 return to a 90-degree angle to the tower 120, as commanded by the controller. This mode is maintained throughout the period of high wind speeds in Region 4, with the thrusters maintaining the turbine facing the wind. As the wind dies down to Region 2 or 3, operation is resumed as indicated in the foregoing, or windspeed below Region 2 results forward tower tilt with the wind as in Region 1. There may be some variations to this protocol depending on wind turbulence and sea state.

The mass of the tower 120 and the turbine 110 is offset to the upwind mass of the spar 130, and the connecting buoyancy chamber 132 is configured for a buoyancy volume distribution that is proportionately greater near the tower axis, than towards the spar axis. This buoyancy chamber volume distribution is made by widening (or deepening—not shown) the buoyancy chamber 132 around the axis of the tower 120, with the combined effect of shifting the center of mass forward. This arrangement results in the center of buoyancy 135 being closer to the tower 120 than to the spar 130, while the center of mass 137 is located sufficiently below the center of buoyancy 135 to provide the required vertical stiffness under all wind and sea state conditions. This spar-tower offset has the effect of cantilevering the mass of the spar 130 upwind to add resistance to the overturning moment of the wind thrust on the turbine/tower of vessel 100, which allows for reduced outrigger float 142 capacity and less spar ballast 136 and/or a shorter spar 134.

Figure 3:
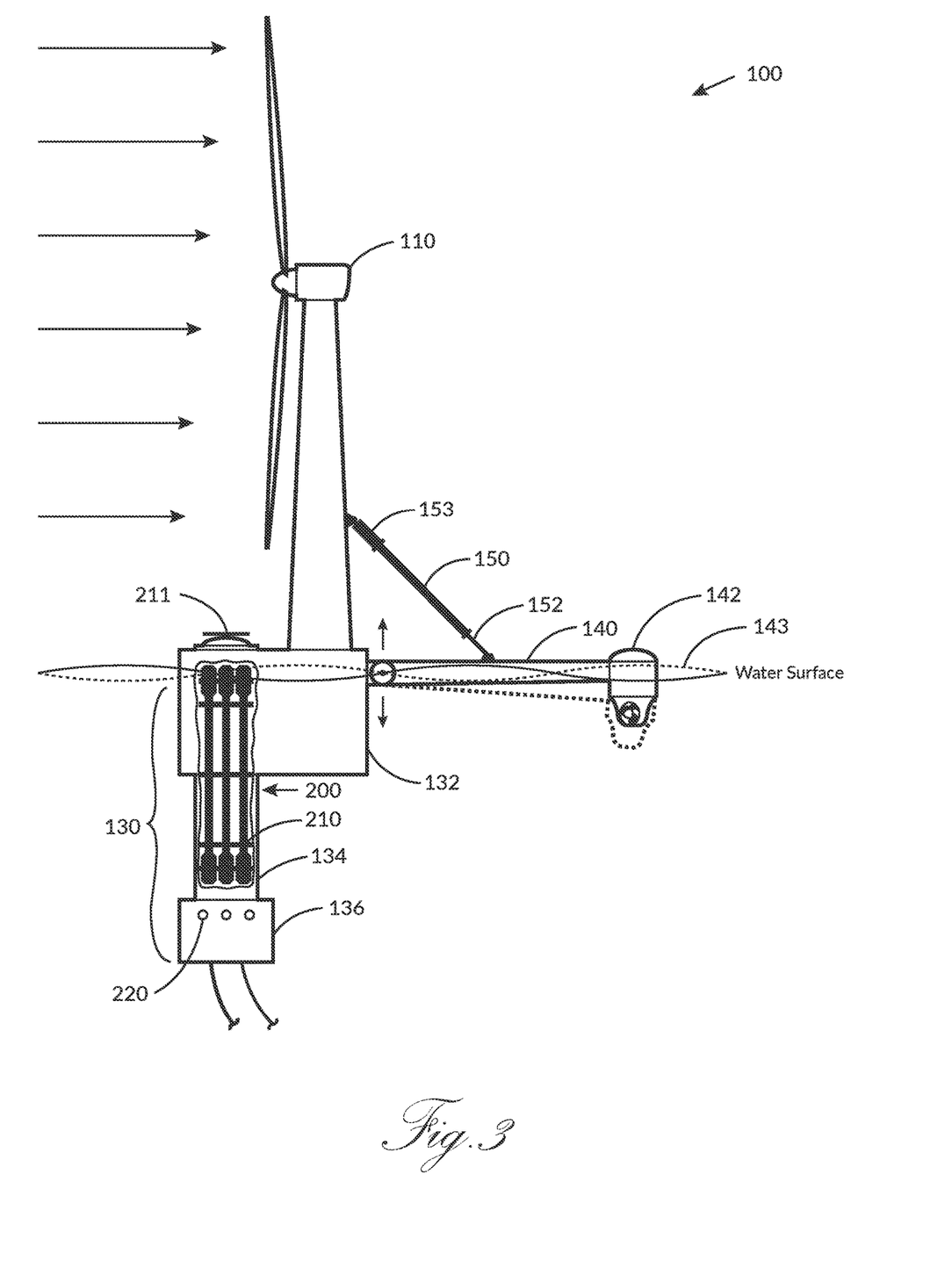
FIG. 3 illustrates outrigger floats responding to wave heave force to drive a generator separate or in combination with the wind turbine to power the desalination system and includes a view of the platform section in which the surface of the buoyancy chamber and spar is removed to expose an internal, subsurface desalination system.

FIG. 3 shows the struts 150 comprises an internal electrical generator 153 (hidden from view) to convert wave heave energy to electric power. For example, the linear electrical generator 153 utilizes the heave energy from ocean waves 143 to drive magnets through a stator and converts linear motion into electric power, the implementation of which is apparent to one of ordinary skill in the art. Wave energy capture is based on the limited vertical motion response of the spar buoy vessel 100 to waves' heave force. Thus, the vessel provides a stable base for a wave generator to react against to convert the wave energy. Power generation by wave energy may also be accomplished with a rotary generator, a hydraulic piston, and hydraulic motor, or a mechanical method such as a rack and pinion mechanism to drive a generator. The driving float of these power take-off systems may connect the float by other means to the power take-off system and may be located on other parts of the spar vessel which it reacts against.

Superimposed on the turbine controller's wind force response commands to maintain vertical or near-vertical tower angle and optimized rotor plane pitch, sea state response commands are implemented to not only cause the reaction of strut actuators 152 to drive tower-outrigger 140 angle changes but also to respond to wave heave 143 inputs. The strut actuator 152 primarily maintains the vertical positioning of the tower 110. The strut actuator 152 responds to generally slower and less frequent changes of the wind force. In contrast, the linear generator 153 is driven by the short periodic heave force of the waves 143 on the floats 142 with resulting forces induced in the outriggers 140 counteracted to generate electrical power. This wave-driven power is additive to the wind-turbine-generated power and extends power capacity in periods when the wind speed diminishes and wave action continues.

The operation of wind turbine generator 110 and the outrigger floats 142 driving generator 153 provides the electric power for the desalination vessel 100. The cutaway view of the desalination vessel 100, in which the surface of the cylindrical section 134 is removed to expose an internal, subsurface desalination system 200 comprising a plurality of RO membrane tubes 210. In an embodiment of the invention, the cylindrical section 134 may be narrower than the buoyancy section 132 and the ballast section 136, thereby concentrating the center of buoyancy nearer to the water surface and the ballast further from the surface, which is essential to the vertical stability of the floating wind turbine powered vessel 100. The ballast section 136 contains high-density material and forms the base of the spar buoy 130. Cylindrical section 134 in this embodiment is neutrally buoyant. Therefore, below the cylindrical section 134 is the heavy ballast section 136 with seawater screening inlet ports 220 feeding the desalination system 200 through a heavy media filtration bed (not shown) contained within the ballast section 136. The media filtration bed contains sand, gravel, and other dense material through which seawater filtration occurs. Filtered seawater is pumped to the RO membrane tubes 210, aggregated in packs of tubes to facilitate efficient extraction through a hatch 211 to the surface deck for replacement during servicing.

With power for the desalination system 200 supplied by the wind turbine 110 and the wave-driven generator 153, the vessel 100, if connected to shore power, can deliver a combination of fresh water and electric power, thus, altering the ratio to meet time-of-day or the seasonal most valued need.

Figure 4A:
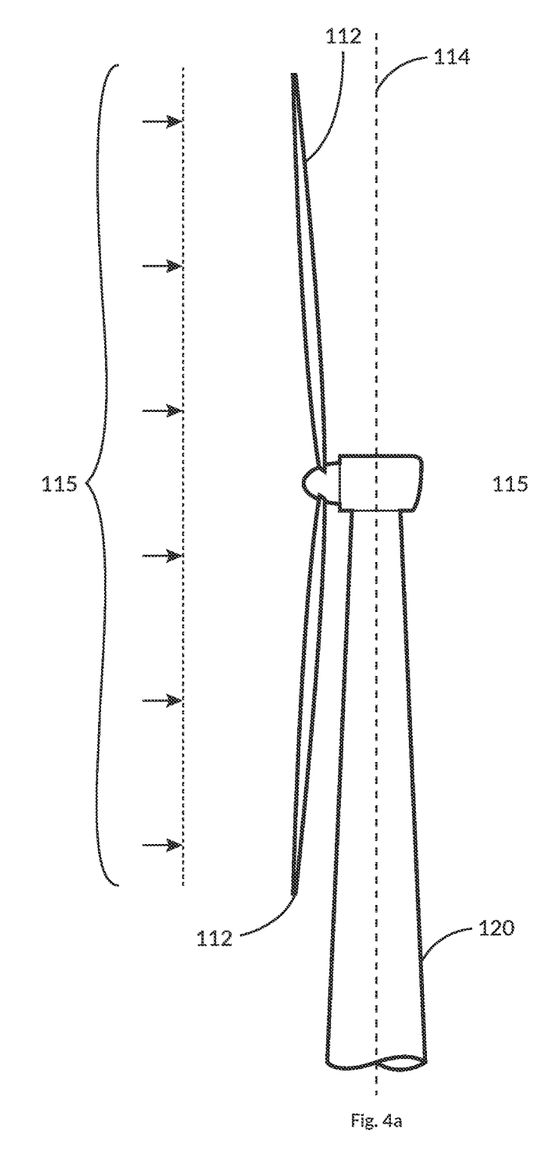
FIG. 4 illustrates low wind shear on the rotor with no rotor plane vertical adjustment and rotor plane back pitch adjustment.
Figure 4B:
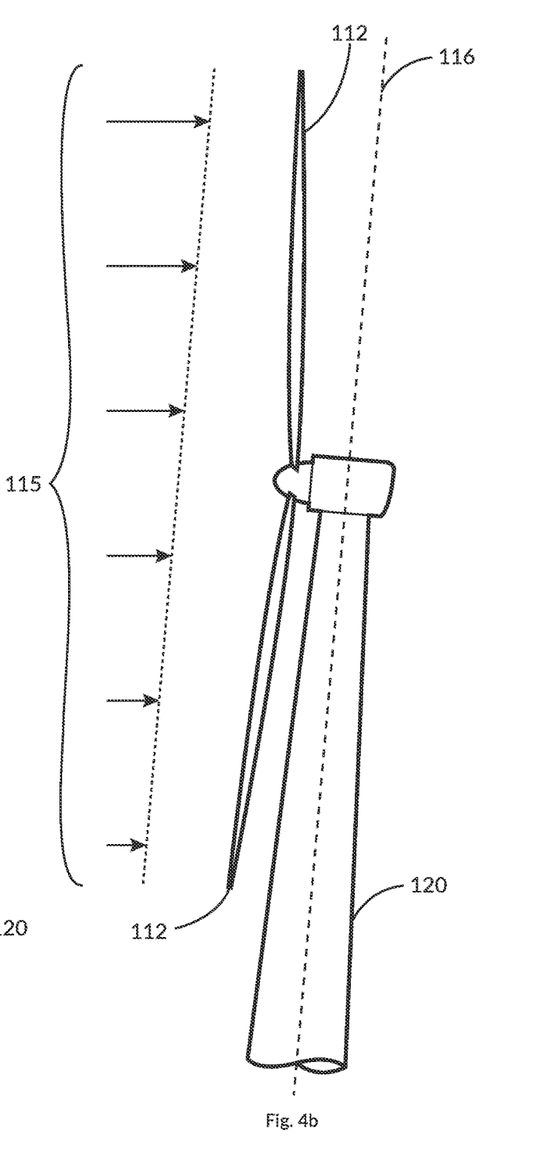

FIG. 4a shows low wind shear 115 and no adjustment to the vertical axis of the tower 120 by the strut actuator 152. FIG. 4b illustrates that in response to high vertical wind shear 115 across the rotor blade plane of the turbine 110, to minimize rotor blade cyclic structural loads due to windshear, the strut actuator 152 may be commanded to reduce the tower-to-outrigger angle by a few degrees, tilting the tower downwind. This compensates for wind shear, causing excessive wind thrust loading of the upper region of the rotor plane relative to the lower region. A conventional way to reduce differential loading across the rotor's vertical plane is for the blades to be pitched on every revolution to spill the higher velocity wind in the rotor plane's upper region. The wear and fatigue on the blade pitch system are appreciated when considering a 30-to-50-ton blade pitching a few degrees 6 to 12 times per minute. Present wind turbines are not designed to alter the vertical rotor, only the horizontal by yawing. By tilting back the plane of the rotor, it allows the vector of rotational movement of the blades to align with changes in wind velocity due to shear, creating a net reduction of wind velocity in the upper region and increase the net velocity in the lower region of the rotor plane, resulting in a reduction in the differential of shear loading at the blade's outer end, as it travels between the upper and lower regions.

Windspeeds typically increase with height above the water surface, resulting in wind shear due to the frictional drag on the water surface. Adjusting for wind shear, as an example, the actuator 152 contracts the strut 150 to decrease the angle between the tower 120 and the outriggers 140 from ninety degrees (90°) to eighty-five degrees (85°), where the rotor plane angle of the WTG 110 has the effect that a blade 112 in the six o'clock position, as it rotates up, effectively retreats from the increasing wind speed, offsetting the increasing windspeed to the twelve o'clock position. There, as it rotates down, the blade 112 advances slightly into the slowing wind speed until it reaches six o'clock again. Rotor plane vertical adjustment helps even-out cyclic wind shear loads on the blades 112, reducing structural fatigue, simplifying the blade/pitch system, and reducing the hub/pitch system's structural fatigue, often a source of the high maintenance of the WTG 110.

The desalinated water produced onboard the vessel 110, combined with the renewable energy captured by the wind turbine and wave-driven generator, can also supply the power for onboard electrolysis equipment to use desalinated water to produce hydrogen and oxygen. This "green hydrogen" may be generated by the vessel 100 with pressurized hydrogen stored in the buoyancy chamber 132. Marine transport vessels are beginning to transition away from carbon fuels, with some early adopters using hydrogen with fuel cells to generate electric power for propulsion. Hydrogen production by the vessel 100 provides at-sea transport vessel fueling and can also be delivered by pipeline to shore-based uses.

In another embodiment of the invention, the buoyancy chamber 130 may also contain data servers powered by the onboard wind and wave energy converters and efficiently cooled by seawater. Also, onboard battery storage or hydrogen fuel cells may be included as standby power capacity.

In an embodiment of the invention, deployment of the vessel 100 is by horizontal positioning with the outriggers 140 and pontoons 142 folded toward the tower 120. The reaction strut 150 disconnected from the mast 120 and held fast against the turbine tower base 133. In this position, unballasted vessel 100 is towed to its operating site, where the mooring lines, power cables, water delivery pipeline are connected, and the ballast section 136 is filled with water. This serves as variable ballast, shifting the center of mass to the lower end of the vessel 100, causing rotation to a vertical operating position.

With the vessel 100 in a vertical position, the media filter bed is loaded with gravel, sand, etc., displacing a portion of the seawater ballast. The media filter bed loading is performed on the surface, transferring sand, gravel, etc., through a chute to the media tanks. The RO system 200 is designed for years of operation with periodic media filter back-flushing and filter material replacement as it is depleted over time.

Once vertical, the struts 150 are connected, and the vessel 100 is ready for turbine mounting, now a well-developed process with specialized turbine delivery crane ships.

In an embodiment of the invention, the controller is implemented as a microcontroller or a system on a chip, the implementation of which are apparent to one of ordinary skill the art.

The invention has been described herein using specific embodiments for illustration only. However, it will be readily apparent to one of ordinary skill in the art that the invention's principles can be embodied in other ways. Therefore, the invention should not be regarded as limited in scope to the specific embodiments disclosed herein; it should be fully commensurate in scope with the following claims.

I claim:

1. A floating vessel comprising:
   a spar buoy, wherein the spar buoy comprises a cylindrical section and a deck;
   a tower affixed to the deck of the spar buoy, wherein a vertical axis of the tower and a vertical axis of the cylindrical section are offset, the floating vessel's center of mass is located windward of its center of buoyancy, creating a forward tilt;
   a wind turbine generator affixed to the tower;
   a desalination system located in the spar buoy;
   one or more outriggers connected to the spar buoy, wherein each of the one or more outriggers comprises a float; and
   an adjustable strut coupling the one or more outriggers to the tower.

2. The floating vessel of claim 1, further comprising a wave energy converter coupled to the adjustable strut.

3. The floating vessel of claim 1, further comprising a pump coupled to the adjustable strut, wherein the pump is in fluid communication with the desalination system.

4. The floating vessel of claim 1, further comprising a thruster affixed to the float of one of the one or more outriggers.

5. The floating vessel of claim 1, wherein the adjustable strut comprises an actuator to adjust a length of the adjustable strut.

6. The floating vessel of claim 5, wherein the actuator to adjust a length of the adjustable strut, adjusts an angle formed between the tower and the one or more outriggers.

7. The floating vessel of claim 1, wherein the spar buoy further comprises a buoyancy chamber and a ballast section, wherein the cylindrical section houses the desalination system, water in the desalination system serves as ballast, and the ballast section comprises a dense mass media filtration system at the base of the ballast section, which is in fluid communication with the desalination system.

8. The floating vessel of claim 7, further comprising a hydrolysis system in fluid communication with the desalination system, wherein hydrogen or oxygen produced by the hydrolysis system is stored in the buoyancy chamber.

9. The floating vessel of claim 1, wherein a vertical axis of the wind turbine generator is offset downwind from a vertical axis of the spar buoy.

10. A floating vessel comprising:
    a floating platform, wherein the floating platform comprises a cylindrical section and a deck;
    a tower affixed to the floating platform, wherein a vertical axis of the tower and a vertical axis of the cylindrical section are offset, the floating vessel's center of mass is located windward of its center of buoyancy, creating a forward tilt;
    a wind turbine generator affixed to the tower;
    means for adjusting yaw of the tower and the wind turbine generator;
    means for adjusting pitch of the tower; and
    wherein the means for adjusting pitch of the tower relative to the floating platform comprises an adjustable strut and one or more outriggers.

11. The floating vessel of claim 10, further comprising a wave energy converter, or a pump.

12. The floating vessel of claim 1, further comprising means for converting seawater into freshwater.

13. The floating vessel of claim 1, wherein the forward tilt is between 5 to 8 degrees to vertical.

14. The floating vessel of claim 10, wherein the forward tilt is between 5 to 8 degrees to vertical.

* * * * *